(12) United States Patent
Kimball et al.

(10) Patent No.: US 7,680,691 B2
(45) Date of Patent: Mar. 16, 2010

(54) INVENTORY MANAGEMENT SYSTEM USING RFID

(75) Inventors: James F. Kimball, Hales Corners, WI (US); Stephen B. Leonard, Franksville, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 1237 days.

(21) Appl. No.: 10/834,814

(22) Filed: Apr. 29, 2004

(65) Prior Publication Data

US 2005/0258961 A1    Nov. 24, 2005

(51) Int. Cl.
G06G 1/14    (2006.01)
G06Q 20/00    (2006.01)
(52) U.S. Cl. .................. 705/22; 235/385; 340/572.1
(58) Field of Classification Search .................. None
See application file for complete search history.

(56) References Cited

U.S. PATENT DOCUMENTS

| | | | |
|---|---|---|---|
| 4,933,525 A | 6/1990 | St. Phillips | |
| 4,990,756 A | 2/1991 | Hoemann | |
| 5,053,339 A * | 10/1991 | Patel | 436/2 |
| 5,180,598 A | 1/1993 | Jozefowicz | |
| 5,229,751 A | 7/1993 | Chandler et al. | |
| 5,266,925 A * | 11/1993 | Vercellotti et al. | 340/505 |
| 5,332,315 A | 7/1994 | Baker et al. | |
| 5,335,509 A | 8/1994 | Namisniak et al. | |
| 5,711,160 A | 1/1998 | Namisniak et al. | |
| 5,798,694 A | 8/1998 | Reber et al. | |
| 5,883,582 A | 3/1999 | Bowers et al. | |
| 5,887,176 A * | 3/1999 | Griffith et al. | 713/320 |
| 5,930,206 A | 7/1999 | Haas et al. | |
| 5,963,133 A * | 10/1999 | Monjo | 340/572.1 |
| 5,963,134 A | 10/1999 | Bowers et al. | |
| 5,969,606 A | 10/1999 | Reber et al. | |
| 5,996,889 A | 12/1999 | Fuchs et al. | |
| 6,002,344 A * | 12/1999 | Bandy et al. | 340/10.2 |
| 6,217,213 B1 | 4/2001 | Curry et al. | |
| 6,285,282 B1 | 9/2001 | Dorenbosch et al. | |
| 6,294,997 B1 * | 9/2001 | Paratore et al. | 340/572.1 |
| 6,298,331 B1 * | 10/2001 | Walker et al. | 705/15 |
| 6,327,576 B1 | 12/2001 | Ogasawara | |
| 6,346,884 B1 | 2/2002 | Uozumi et al. | |
| 6,354,493 B1 * | 3/2002 | Mon | 235/380 |
| 6,453,687 B2 | 9/2002 | Sharood et al. | |
| 6,466,130 B2 | 10/2002 | Van Horn et al. | |
| 6,483,434 B1 | 11/2002 | UmiKer | |
| 6,557,760 B2 | 5/2003 | Goodwin, III | |
| 6,598,790 B1 | 7/2003 | Horst | |

(Continued)

FOREIGN PATENT DOCUMENTS

WO    WO 97/23060    6/1997

(Continued)

*Primary Examiner*—F. Zeender
*Assistant Examiner*—Luna Champagne

(57) ABSTRACT

An inventory management system is provided that includes an RFID interrogator and corresponding RFID tags that are placed on items to be monitored. The tags can be used to monitor the storage time of food items stored in a refrigerator or pantry, the time in use of replaceable items such as toilet bowl cleaners, or the nature of laundry items being washed. The interrogator can be coupled to a display providing various reports on the status of such items. Also disclosed are devices for dispensing such RFID tags.

6 Claims, 15 Drawing Sheets

U.S. PATENT DOCUMENTS

| | | |
|---|---|---|
| 6,600,418 B2 | 7/2003 | Francis et al. |
| 6,601,764 B1 | 8/2003 | Goodwin, III |
| 6,609,656 B1 | 8/2003 | Elledge |
| 6,982,640 B2 * | 1/2006 | Lindsay et al. ............... 340/540 |
| 6,989,750 B2 * | 1/2006 | Shanks et al. ............. 340/572.4 |
| 7,015,826 B1 * | 3/2006 | Chan et al. ............. 340/870.17 |
| 7,070,053 B1 * | 7/2006 | Abrams et al. ............ 206/459.5 |
| 7,106,202 B2 * | 9/2006 | Dickinson ................ 340/572.8 |
| 2001/0025349 A1 | 9/2001 | Sharood et al. |
| 2001/0048030 A1 | 12/2001 | Sharood et al. |
| 2001/0056376 A1 | 12/2001 | Walker et al. |
| 2002/0000092 A1 | 1/2002 | Sharood et al. |
| 2002/0016739 A1 | 2/2002 | Ogasawara |
| 2002/0026325 A1 | 2/2002 | Hirahara et al. |
| 2002/0047781 A1 | 4/2002 | Fallah |
| 2002/0139838 A1 | 10/2002 | Goodwin, III |
| 2002/0147649 A1 | 10/2002 | White |
| 2002/0154574 A1 | 10/2002 | Ector, Jr. et al. |
| 2002/0161652 A1 | 10/2002 | Paullin et al. |
| 2004/0069851 A1 * | 4/2004 | Grunes et al. ............... 235/435 |
| 2004/0193449 A1 * | 9/2004 | Wildman et al. ............... 705/2 |

FOREIGN PATENT DOCUMENTS

| | | |
|---|---|---|
| WO | WO 98/24527 | 6/1998 |
| WO | WO 99/50779 | 10/1999 |

* cited by examiner

INVENTORY MANAGEMENT SYSTEM USING RFID

CROSS-REFERENCE TO RELATED APPLICATIONS

Not applicable

STATEMENT REGARDING FEDERALLY SPONSORED RESEARCH/DEVELOPMENT

Not applicable

BACKGROUND OF THE INVENTION

The present invention relates to inventory management systems that use radio frequency identification tags. It appears especially well suited to determine the status of stored food, the need for replacing, refilling, or maintaining items requiring such servicing on a periodic basis, and whether items about to be washed together are compatible.

Consumers purchase a variety of goods that become unusable after prolonged storage. Some of these goods (e.g. dairy items, vegetables, meats) are stored in a refrigerator to prolong the storage life of the item. However, once the item is stored (either in cooked/leftover form, or uncooked form), a consumer may forget about the item for too long a period. Then, when the consumer remembers the item, the consumer may discover that the item is no longer suitable for use. This is wasteful and leads to consumer dissatisfaction.

A variety of relatively "airtight" storage containers have been developed to prolong the storage life of items (e.g. reclosable bags; plastic reclosable containers). However, even where such a bag/container is transparent, the consumer may fail to see the item stored therein until it is no longer usable (e.g. the storage container becomes positioned behind a milk carton).

There have been some attempts to use computer technology to provide inventory management control and reporting regarding inventories of various perishable items. For example, there is a system for tracking the manufacturer's suggested expiration dates of various food products, utilizing radio frequency identification (RFID) technology.

An RFID tag attached to each item is encoded with the expiration date of a given food product. That tag can then be scanned to determine whether that expiration date has either passed or is approaching. However, that requires the user to remember to scan the storage containers on a regular basis to obtain such feedback.

There have also been attempts to manually enter identifications of food products in an electronic database along with the manufacturer's expiration date for each product. The database is provided with timing technology that enables the user to activate a display that, in turn, provides "expiration" information.

Of course, the manufacturer's recommended expiration date is merely an indication of when an item might theoretically spoil if the original package has not been opened. Once the packaging for a perishable item is opened, or if the item is cooked or mixed with other items, the item will usually have a different storage life.

As another example, some household products can require refilling, replacement or other maintenance on a predictable, regular basis. For instance, conventional air fresheners can be plugged into a conventional electrical receptacle, and have air freshening cartridges that have a predetermined lifetime. Similarly, a toilet cleaning block or cartridge can require periodic replacement or refilling. Also, air filters for home furnaces require periodic replacement. In each case, a failure to refill or replace in a timely manner may have adverse consequences.

Another common problem is that various types of laundry (e.g. colors) are best washed in particular conditions. A load of white clothes can be bleached in hot water. If a colored item (e.g. a sock) is accidentally mixed into the wash, the color from the item can bleed into the other clothes.

Therefore, a need exists for improved inventory management systems for a variety of applications of interest to consumers.

BRIEF SUMMARY OF THE INVENTION

In one aspect the invention provides a management system for determining the time that a selected perishable food product has been monitored. The system has a radio frequency identification tag suitable to be linked to the perishable food product or a container therefor, and an interrogator suitable to interrogate the radio frequency identification tag.

The interrogator has a processor that can execute a stored program to apply an initial interrogation signal to the identification tag as one begins to monitor the food product; receive an initial response signal from the identification tag in response to the initial interrogation signal, wherein the initial response signal has tag identification information; store the tag identification information along with an indication of an initial monitoring time; apply a subsequent interrogation signal to the identification tag, wherein the subsequent interrogation signal occurs after the initial interrogation signal; receive a subsequent response signal from the identification tag in response to the subsequent interrogation signal, wherein the subsequent response signal includes the tag identification; and determine the elapsed time between the initial monitoring time and the time of the subsequent response signal.

This system is particularly useful for food items stored in a selected cabinet. By food item we mean any food or beverage item. By cabinet we mean, without limitation, refrigerators (e.g. freezers), room cabinets, pantries, shelves, and other storage structures.

In preferred forms the interrogator has a timer and a display configured to output the elapsed time that the food product has been stored. Preferred interrogators can also receive an identification of a characteristic of the food product that can be displayed along with the elapsed time that the food product has been stored.

In other preferred forms the identification of the food product characteristic can be transmitted to the interrogator from the identification tag, where it can be stored by the interrogator. There can also be an external processor coupled to the interrogator for maintaining a database of food product characteristic information and storage initiation time information.

In some forms the interrogator is configured to be mounted onto a door (e.g. a hook or adhesive that connects the interrogator to a refrigerator or pantry door). In such an embodiment the interrogator can have an antenna, such as one directable into a pantry.

Some embodiments attach the tag to a food storage container (e.g. the lid of such a container), or to a storage container fastener. In the latter embodiment there can be a switch linked to the fastener that activates the tag when the switch is closed.

To avoid the need for a battery on the tag, the tag can be of the passive RFID type. Hence, the only power sources need be associated with the interrogator/processor.

In another aspect the invention provides methods based on use of these food inventory management systems.

Still another aspect of the invention provides a management system for determining the time that a selected item is to be replaced, refilled or otherwised maintained. The system has a radio frequency identification tag suitable to be linked to the item, or suitable to be linked to a container therefor, and an interrogator suitable to interrogate the radio frequency identification tag.

The interrogator has a processor that can execute a stored program to apply an initial interrogation signal to the identification tag essentially when monitoring of the item begins; receive an initial response signal from the identification tag in response to the initial interrogation signal, wherein the initial response signal has tag identification information; store the tag identification information; apply a subsequent interrogation signal to the identification tag, wherein the subsequent interrogation signal occurs after the initial interrogation signal; receive a subsequent response signal from the identification tag in response to the subsequent interrogation signal, wherein the subsequent response signal includes the tag identification; and determine from the nature of the response signal whether refill, replacement or other maintenance with respect to the item is appropriate.

In preferred forms the tag is linked to a sensor that monitors the condition of the item, the sensor modifying the nature of the response signal that the tag sends when the item is ready for refill, replacement or other maintenance, the system also outputs a signal when it has determined that a selectable item is ready to be replaced, refilled, or otherwise maintained, and the item is selected from the group consisting of air fresheners, toilet bowl cleaners and air filters.

In yet another aspect the invention provides methods for using such replacement/refill/maintenance monitoring systems.

A further aspect of the invention relates to an inventory management system for articles of clothing. There are a plurality of radio frequency identification tags, at least one of these tags being attached to each of the articles of clothing within the system. Each such tag includes tag identification data and category data. There is also an interrogator attached to or proximately positioned adjacent a clothes treatment machine and capable of executing a stored program to produce an interrogation signal as articles of clothing are placed into the clothes treatment machine; receive response signals from the corresponding identification tags in response to the interrogation signal; and determine from the response signals whether all of said tagged articles of clothing entering the clothes treatment machine belong to the same category.

These management systems enable a user to perform a number of desired functions. One can keep track of how soon stored food is likely to become unusable. One can have accurate information available as to when replaceable and refillable items in the home need service. Also, one can have a warning system for when clothes have been inappropriately mixed in a washing machine.

The systems can work without requiring electrical power sources on the RFID tags themselves. Hence, the tags can be inexpensively produced and applied. The systems can also be designed to work automatically, with minimal consumer labor required.

The foregoing and other advantages of the invention will appear from the following description. In the description reference is made to the accompanying drawings which form a part thereof, and in which there is shown by way of illustration, and not limitation, preferred embodiments of the invention. Such embodiments do not necessarily represent the full scope of the invention. Hence, reference should therefore be made to the claims herein for interpreting the scope of the invention.

DETAILED DESCRIPTION OF THE PREFERRED EMBODIMENT

Figure 1:
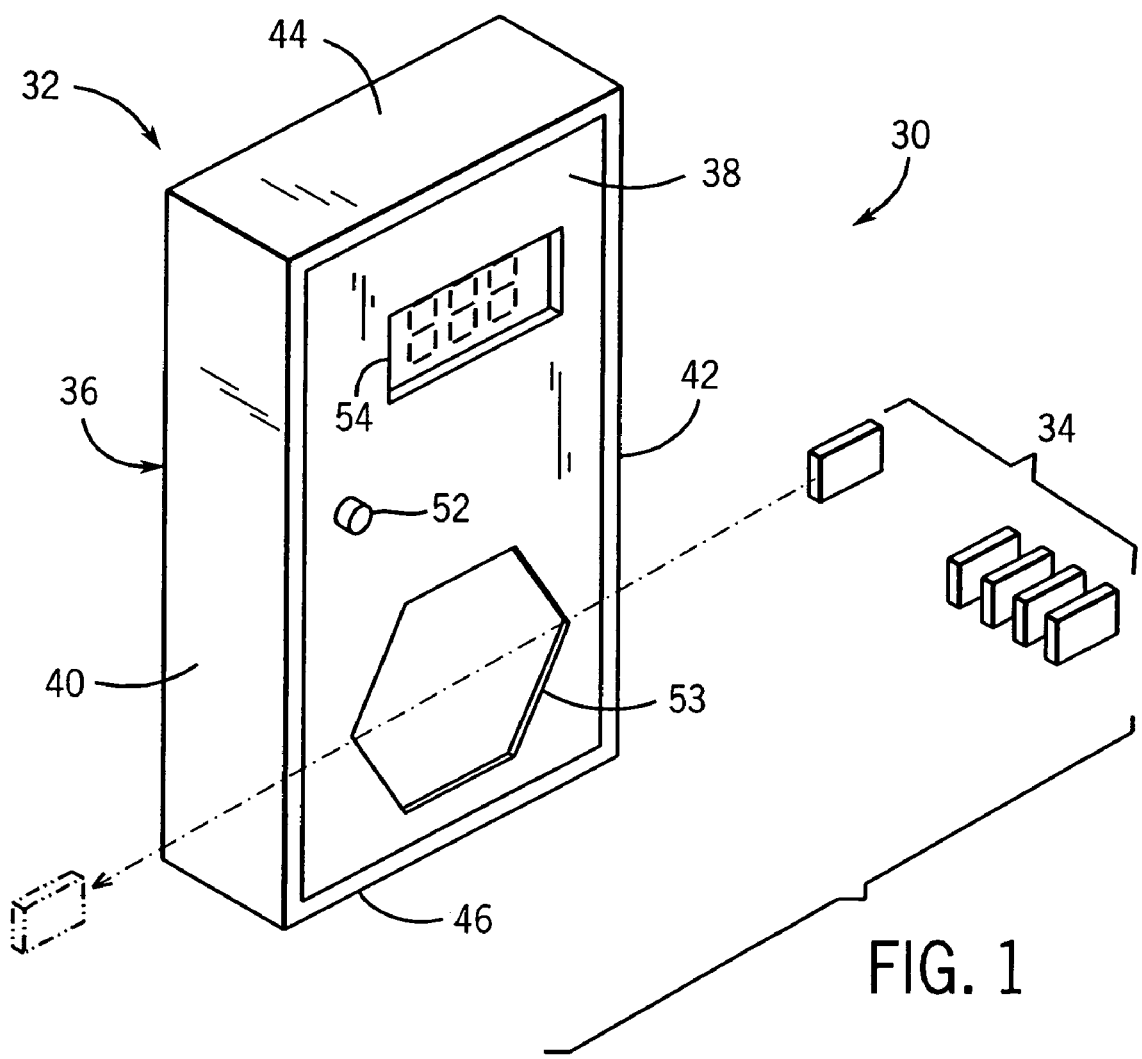
FIG. 1 is a schematic perspective view of an array of RFID tags capable of communicating with an interrogator in accordance with a preferred embodiment of the present invention.
Figure 2:
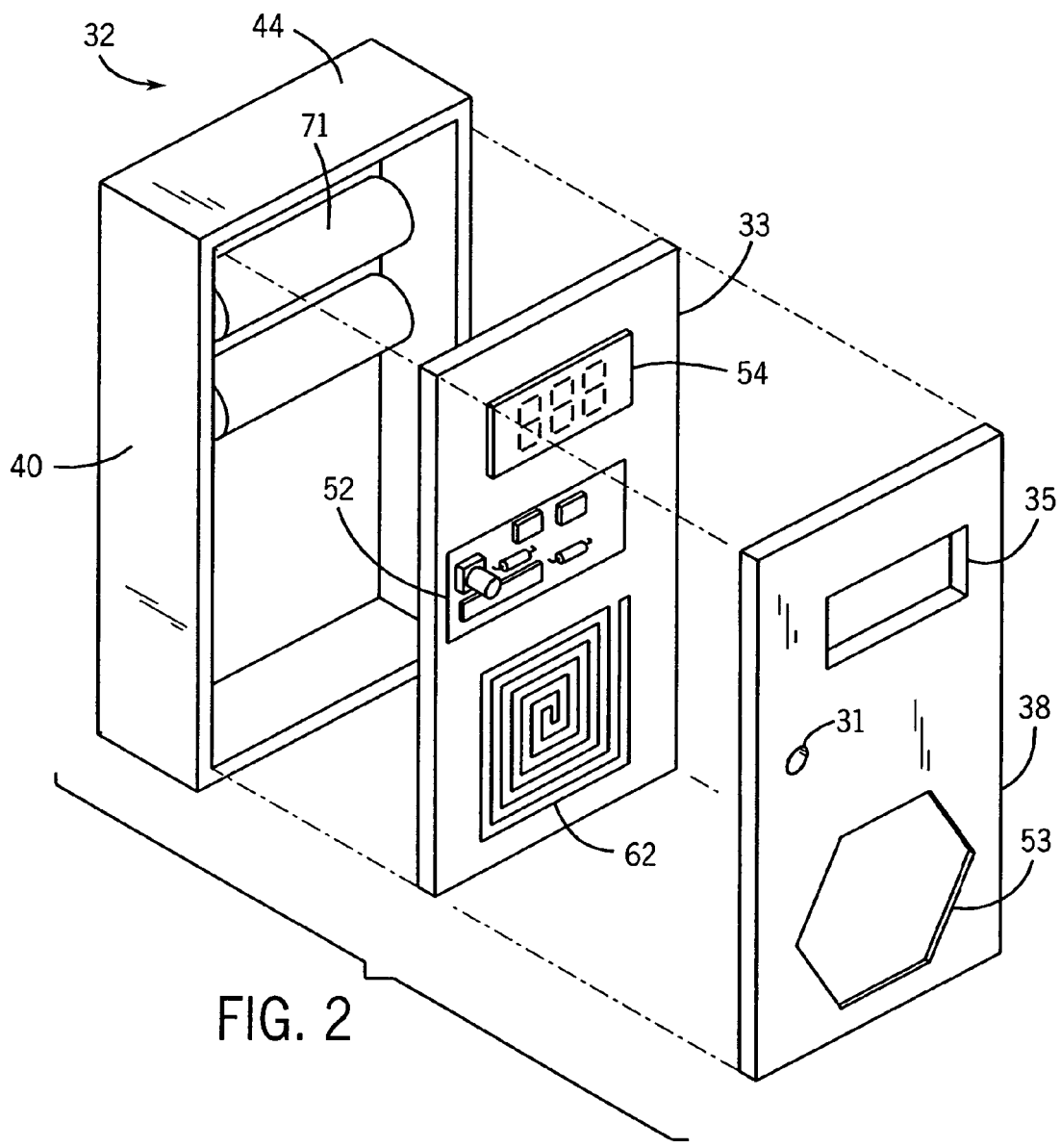
FIG. 2 is an exploded perspective view of the interrogator illustrated in FIG. 1.

Referring first to FIGS. 1-4, an RFID-based inventory management system 30 includes an interrogator 32 and several RFID tags 34. Interrogator 32 is in the form of a housing 36 having a front face 38, a rear face (not shown) opposite the front face, side walls 40 and 42, and upper and lower end walls 44 and 46, respectively.

Interrogator 32 includes a board 33 disposed inside housing 36 that carries a processor 56, which is connected to a transceiver 48. Board 33 further carries a user interface having an input 52 extending through an opening 31 formed in the front face, and a display 54 visible via a window 35 formed in the front face 38. Input 52 can include a keyboard interface that is connected to an external keyboard or keypad, or alternatively can be connected to an integral data entry device 50 via interface 51.

Alternatively still, or in addition, input 52 can be a conventional touchscreen. Accordingly, the user can input data into the interrogator processor 56 such as food identification information (e.g. "cheese") along with a maximum storage date pertaining thereto. Display 54 includes an LCD screen or other suitable device operable to display output characters or text to the user.

Processor 56 may be designed to further communicate with an incrementing timer or clock 58 and a volatile and nonvolatile memory (collectively identified as memory 60). An opening 53 is provided in front face 38 that exposes an antenna 62, which is coupled to processor 56 via transceiver and emits an energizing magnetic field 67 that may be received by tags 34 when they are within a predefined proximity to interrogator 32.

A power source (not shown) is also provided either via a conventional electrical receptacle or one or more batteries disposed on a battery cavity 71 (See FIG. 2) to supply power to the electronic components of interrogator 32. Interrogators of this type are well-known in the art, and commercially available from companies such as Innovision Research and Technology, located in Wokingham, UK.

Figure 5:
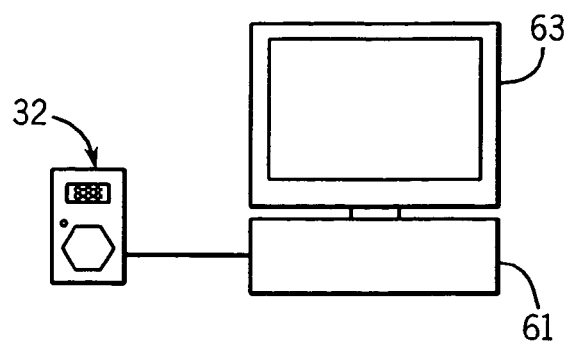
FIG. 5 is a schematic view of the interrogator of FIG. 1 connected to an external computer.
Figure 6:
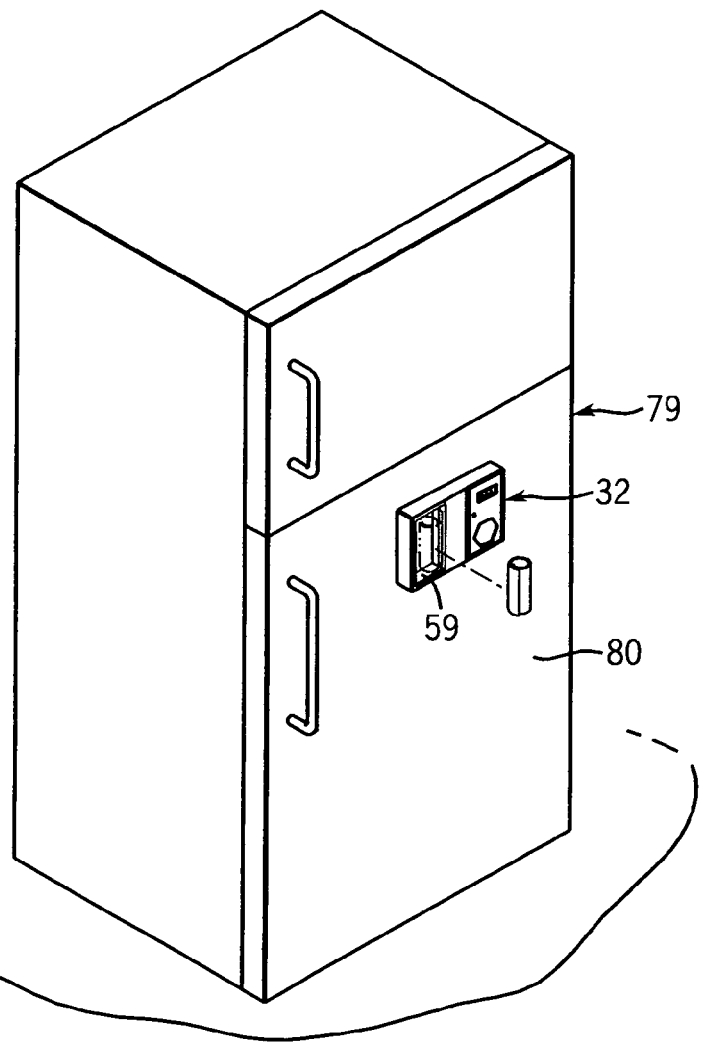
FIG. 6 is a perspective view of the interrogator of FIG. 1 mounted onto a refrigerator via adhesive means.

Referring next to FIGS. 5 and 6, interrogator 32 can be further provided with a printer interface 55 and an interface 57 to an external device. Printer interface 55 can be coupled to a conventional printer 59. Printer 59 can be external or integral with respect to interrogator 32, and is capable of printing text on a paper or like medium. Interface 57 can be connected to a conventional, general purpose, personal computer 61 having a display 63.

Alternatively, interface 57 can be connected to a handheld personal data assistant (PDA) which can operate PALM® or other like software. Communication between interrogator 32 and printer 59, PDA, and/or computer 61, can either be achieved via hard wire connection, or via Bluetooth™ wireless technology, which may be implemented by installing a Bluetooth microchip incorporating a radio transceiver for communication with a corresponding Bluetooth microchip located in the PDA or personal computer 61.

Computer 61 and PDA can further be provided with a modem (not shown) suitable for connection to the Internet via a hard wire connection to a conventional telephone outlet, or via cellular technology. For the purposes of clarity and convenience, computer 61 is used herein to identify the PDA and/or computer 61.

Figure 7:
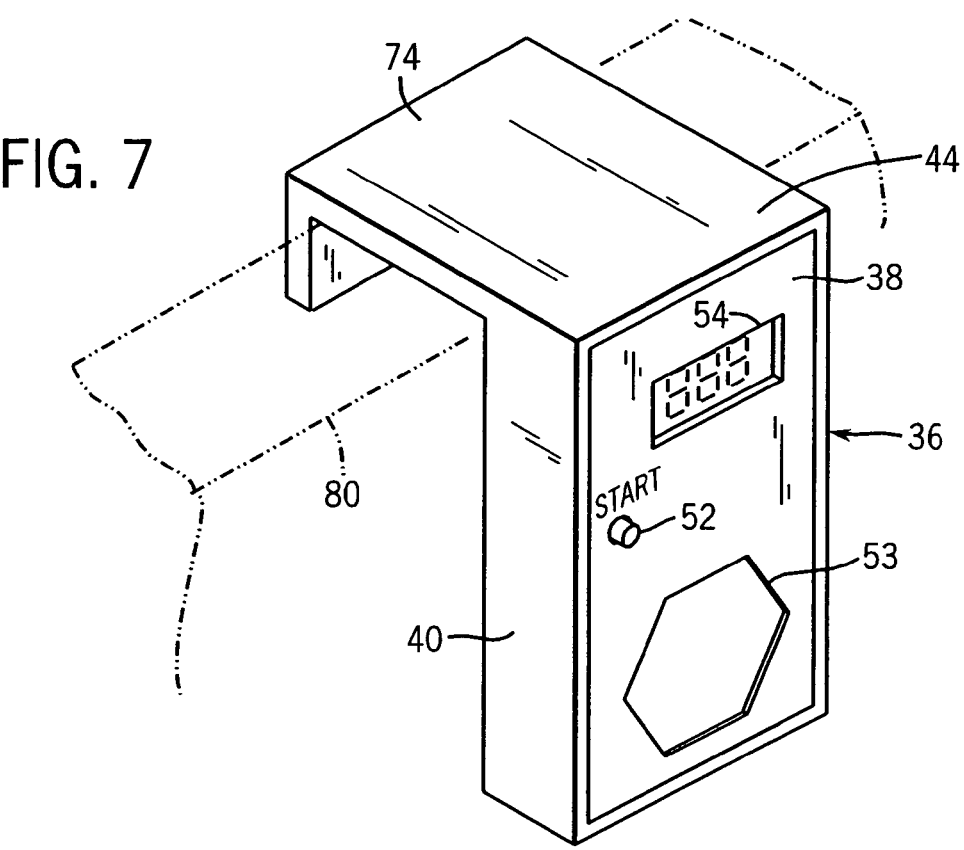
FIG. 7 is a perspective view of the interrogator of FIG. 1 mounted onto a refrigerator door via a hook.

Referring next to FIGS. 6 and 7, interrogator 32 is configured for connection to the door 80 of a conventional refrigerator 79. In particular, the rear face 75 of interrogator housing 36 can be magnetic or adhesive so as to adhere to a refrigerator or freezer door without cutting a hole in the door. Alternatively, interrogator housing 36 can include a clip/hook 39 extending rearward from the rear face. Clip/hook 39 includes a rearward extending wall 74 connected to upper wall 44, and a flange 76 extending downwardly from the rear edge of wall 74.

Flange 76 and the rear face of housing 36 define a gap that is sized to snugly receive upper edge 78 of refrigerator door 80. The position of flange 76 may be adjustable to accommodate doors of varying thicknesses. It should be appreciated that the interrogator could instead be a door or other wall of a non-electrical cabinet, with "cabinet" being used in its broadest sense to also include closed or unclosed shelving, including without limitation pantries.

Figure 8A:
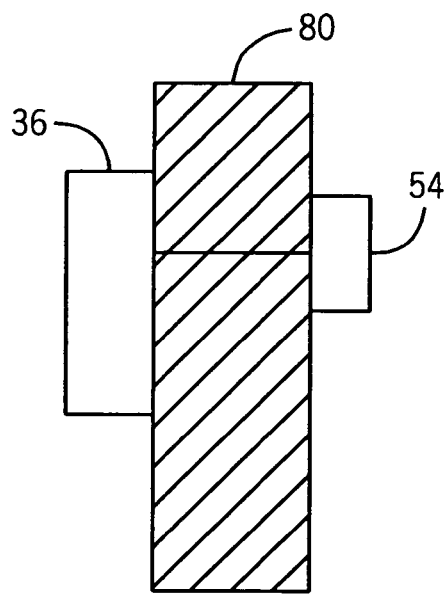
FIGS. 8A and 8B are further views of the interrogator mounted onto a door in accordance with alternate embodiments.

Referring to FIG. 8A, display 54 can for example be mounted to the outer surface 81 of a pantry door 80, or be formed integrally with the door such that the display is visible to the user when door 80 is shut. Interrogator housing 36 can then be mounted to the inner surface 83 of door 80, and includes a port, such as USB port 85, operable to connect processor 56 to display 54.

Figure 8B:
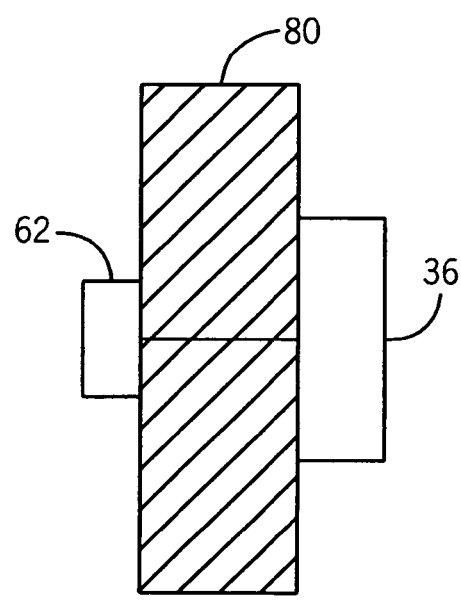

Alternatively, as shown in FIG. 8B, that construction can be modified so that the interrogator is on the outside of the door but an antenna 62 extends into, or through, the door 80. Alternatively still, the antenna could extend around the door 80 in a serpentine manner and into the food storage area.

Figure 13:
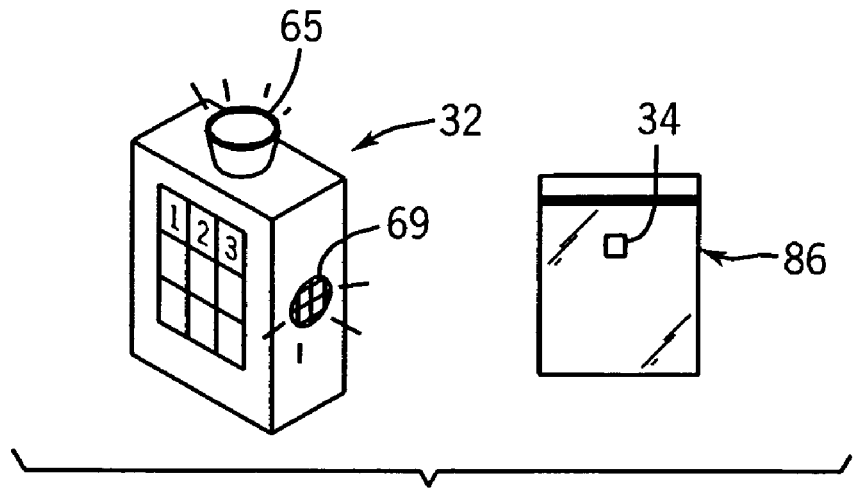
FIG. 13 is a perspective view of the interrogator linked to a microphone and speaker.

Referring next to FIG. 13, interrogator 32 can be provided with a microphone 65 and speaker 69 coupled to processor 56. During operation, the user can activate the appropriate input 52 that initiates a voice recording routine. Accordingly, the user's speech is recorded for a predetermined length of time, and associated with the RFID tag 34 being scanned.

As a result, the next instance that tag 34 is scanned, the voice data stream can be played via speaker to provide audible information regarding the associated food product. Furthermore, interrogator 32 can be programmed with software that enables processor 56 to provide audible information that is stored in memory 70 and communicated to interrogator 32 from tag 34, as is described in more detail below.

Figure 4:
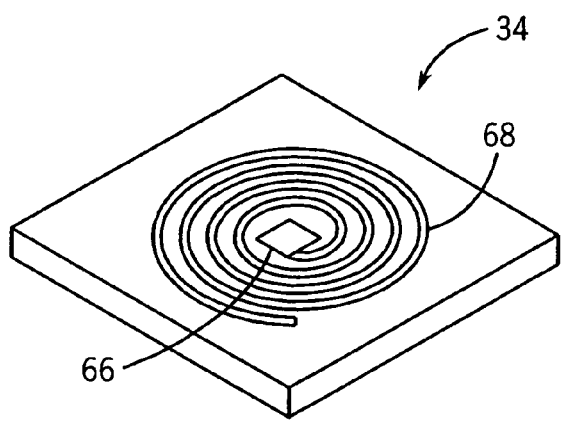
FIG. 4 is a perspective view of the passive RFID tag illustrated in FIG. 3.
Figure 3:
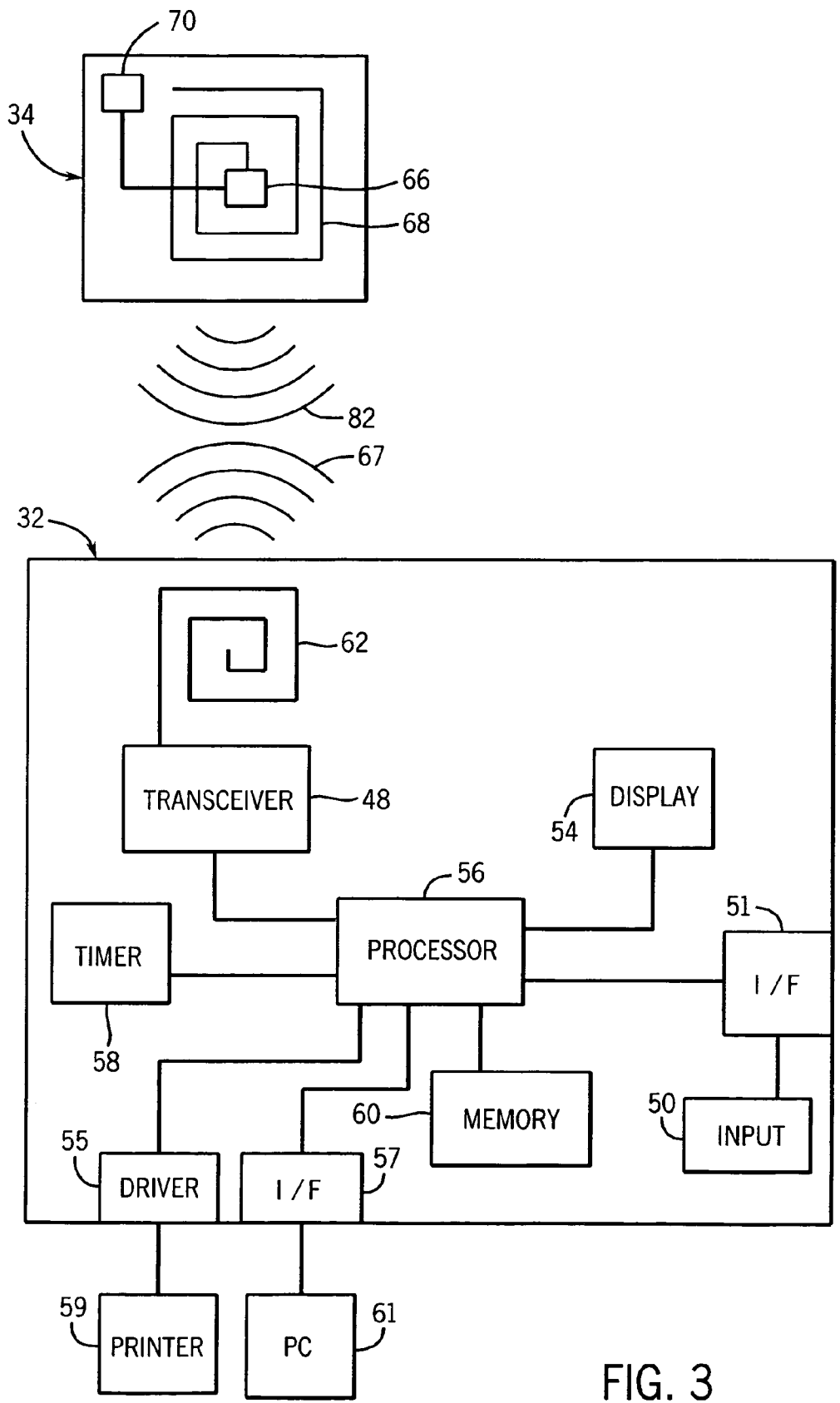
FIG. 3 is a schematic diagram of a passive RFID tag communicating with the interrogator of FIG. 1.

As shown in FIGS. 3 and 4, each RFID tag 34 includes a transponder 66, and an antenna 68 and nonvolatile memory 70 are carried by a substrate 72. Transponder could be replaced by a low-power microprocessor performing the functions of a conventional transponder. Memory 70 can either be connected to, or integral with, transponder 66. Tags 34 are passive as illustrated, and therefore do not include a power source.

Instead, tags 34 can be either inductively or capacitively coupled to provide information to interrogator 32 on demand, as is well known in the art. In inductively coupled tags 34, the transponder 66 is powered by energy from magnetic signal. Transponder 66 then transmits a data signal 82, including the contents of memory 70, to the interrogator 32 via antenna 68.

In a capacitively coupled tag 34, the transponder 66 is formed from silicon, with antenna 68 typically formed from a conductive (e.g., carbon) ink applied to a paper substrate 72. Passive RFID tags of this type can be made relatively inexpensively, and are well-suited for disposable use.

Figure 9:
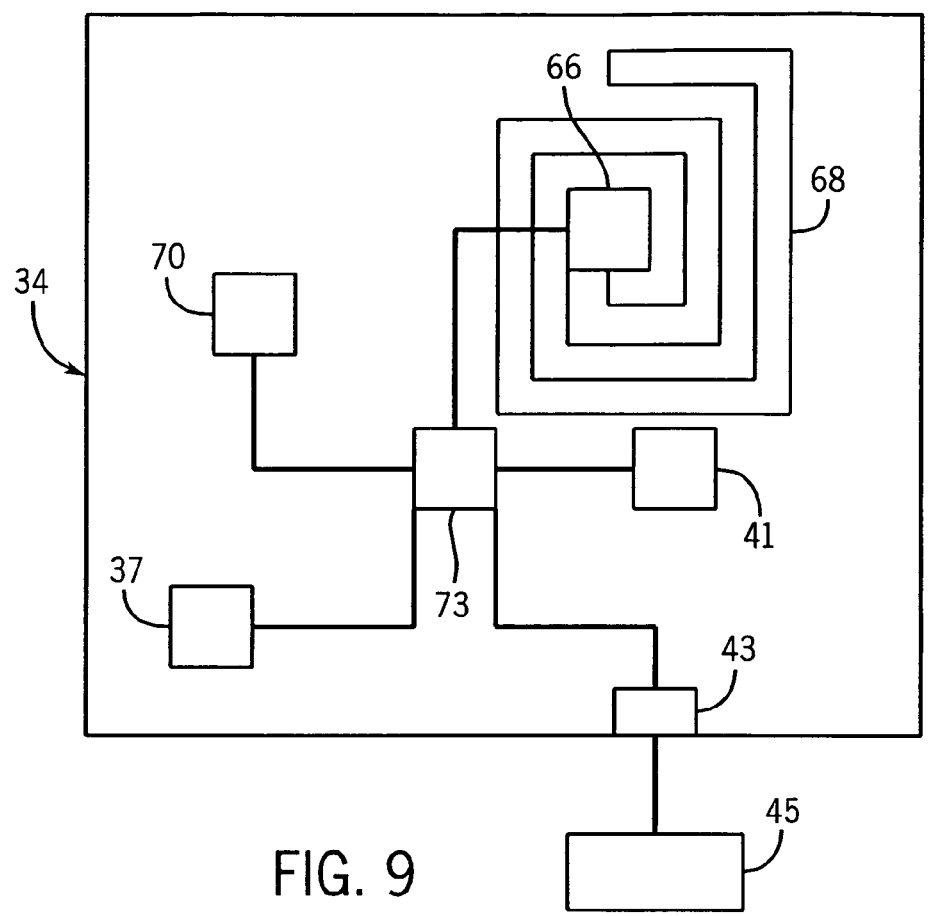
FIG. 9 is a schematic view of an alternative, active, type RFID tag.

Unless otherwise specified, the management system 30 of the present invention is not to be limited to either inductively coupled or capacitively coupled tags, and furthermore is not to be limited to passive tags. As is illustrated in FIG. 9, the present invention also contemplates that tags 34 could be active, including a power source 37, such as a battery, supported by the substrate 72, for providing power to a microprocessor 73.

Microprocessor 73 is in communication with a volatile memory 41 for the temporary storage of data, in addition to nonvolatile memory 70. Microprocessor 73 further controls transponder 66, and can also be connected to an interface 43 providing an input for a sensing or alternative data entry device 45.

Figure 12:
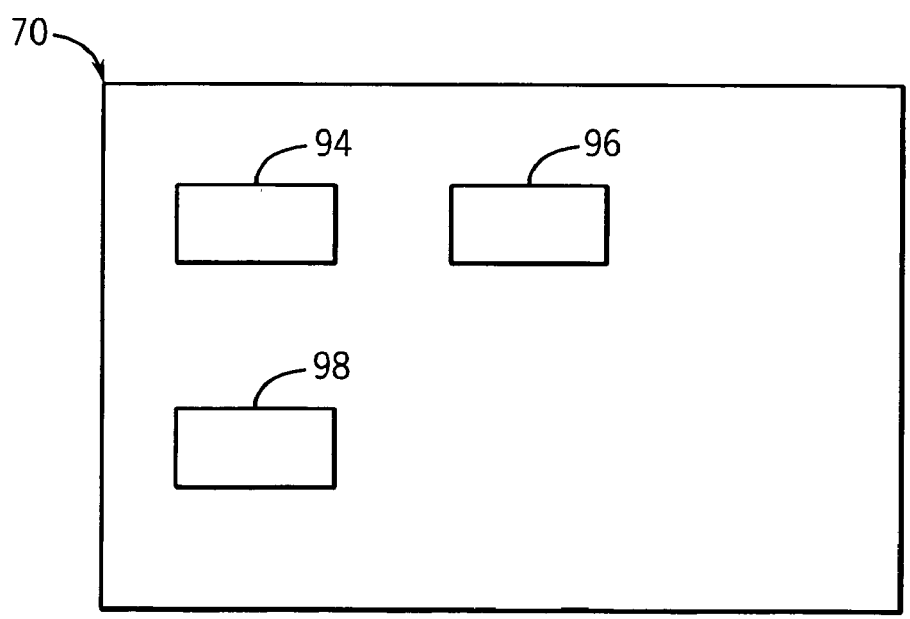
FIG. 12 is a schematic view of a memory structure of the interrogator.

Referring now to FIG. 12, the tag memory 70 can be preprogrammed with only a unique tag identification code 98. Additional information could alternatively be encoded, if desired, including an identification of the food product 94 to which the tag 34 is linked, and the manufacturer's expiration date 96 for the food product.

Alternatively, if tag 34 is of the active type, the user could program memory 70 with the additional information. Alternatively still, the user could manually enter the additional information via a keyboard or like data entry device connected via interface 43 if tag 34 is active. Alternatively still, the user could manually enter the additional information into interrogator 32, which would store the additional information in memory 60 along with the tag identification data. RFID tags of any of the types describe above are well-known in the art, and commercially available from companies such as Innovision Research and Technology, located in Wokingham, UK, Tagsys USA, located in Doylestown, Pa., ASK located in Paris, France, or KSW-Microtec based in Dresden, Germany.

Figure 10:
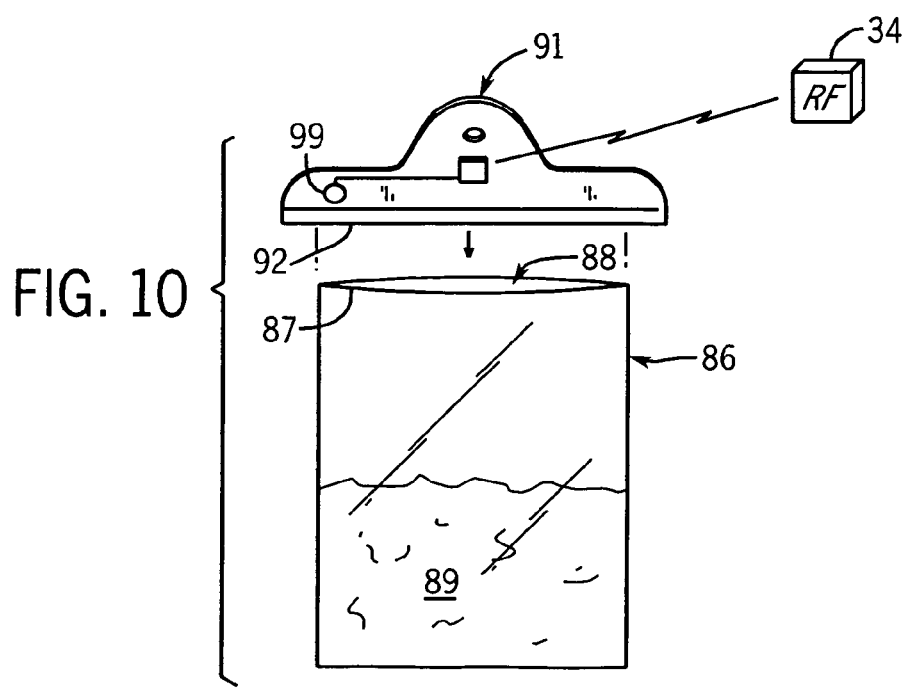
FIG. 10 is a perspective view of an RFID tag attached to a fastener.

FIG. 10 shows a food storage container 86 in the form of a bag having walls 87 that define an enclosure 89 for storing food product and the like. Enclosure 89 defines an open end 88 that is accessible for inserting and removing the food product. Open end 88 can be sealed and reopened using a conventional fastener 91, which is illustrated as a clip presenting sealing surfaces 92 that are biased together under a spring force to close the open end 88. Of course, the closure device could also be linked to the bag itself (e.g. reclosable bags).

RFID tag 34 can either be integrated into the fastener 91, or alternatively can be provided on a paper or other suitable substrate having an adhesive surface that can be attached onto an outer surface of the fastener 91 or bag itself.

A switch 99 can be carried by the fastener 91, and electrically coupled to tag 34, that is operable closes a circuit between the RFID tag microprocessor 66 and power source 37 in an active tag (or alternatively between transponder 66 and antenna 68 in passive tag), thus enabling signal 82 to be emitted when interrogation signal 67 is received. Switch 99 could be normally open when apparatus 91 is closed, thereby enabling the transponder 66 to respond to signal 67 each time the fastener 91 is opened to remove the food product from the container 86 (which closes the switch 99). Switch 99 could alternatively be normally closed, and only enable interrogator 32 to read the tag 34 when the food product is ready to again be stored, and fastener 91 is closed within the predetermined proximity to interrogator.

Figure 11:
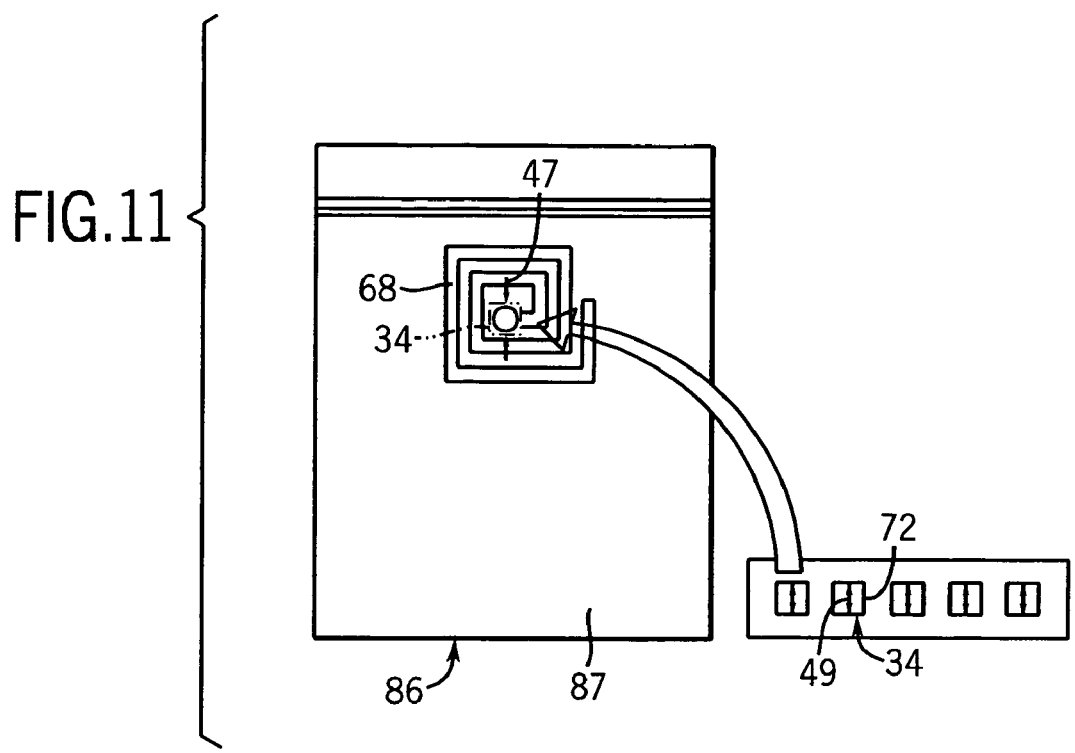
FIG. 11 is a side elevational view of an RFID tag attached to a food storage container.

FIG. 11 shows an embodiment where RFID tag 34 is carried by the walls 87 of container 86. The embodiment in FIG. 11 recognizes that the user may not desire to track all purchased food products using inventory management system 30. Accordingly, a cost-effective system that enables a user to track only those desired food items includes an antenna 68 (e.g., formed from carbon ink) that is pre-printed on the outer surface of wall 87.

Antenna 68 can include one or more terminal ends formed from an anisotropic conductive tape, commercially available from 3M Corporation. Substrate 72 supporting tag 34 is therefore preferably conductive and transparent in accordance with this embodiment, and can be formed from indium oxide.

Wall 87 can include an alignment indicator 47 that is to be aligned with a corresponding indicator 49 located on RFID tag 34 when attaching tag 34 to the container 86. Alignment of indicators 47 and 49 ensures that the terminal ends of antenna 68 are aligned with lead inputs to transponder 66 or microprocessor 73. Advantageously, containers with pre-printed antennas can be cost effectively mass-produced (and integrated with the container label if desired) by avoiding the expense of including an RFID tag on those bags whose contents may not be tracked by the user. Alternatively, tag 34 can be integrated into the one of the walls 87, or can be adhesively or otherwise permanently attached to an outer wall surface.

While container 86 has been illustrated as a bag that is used to retain food product after purchase (e.g. leftovers), the term "container" is intended to encompass any structure having an enclosure suitable for retaining a food product, including original packaging at the point of food purchase. It should moreover be appreciated that fastener 91 could alternatively include a tape strip, rubber band, paper clip, lid, or any alternative apparatus suitable for at least partially closing the open end of a food storage container.

Figure 14:
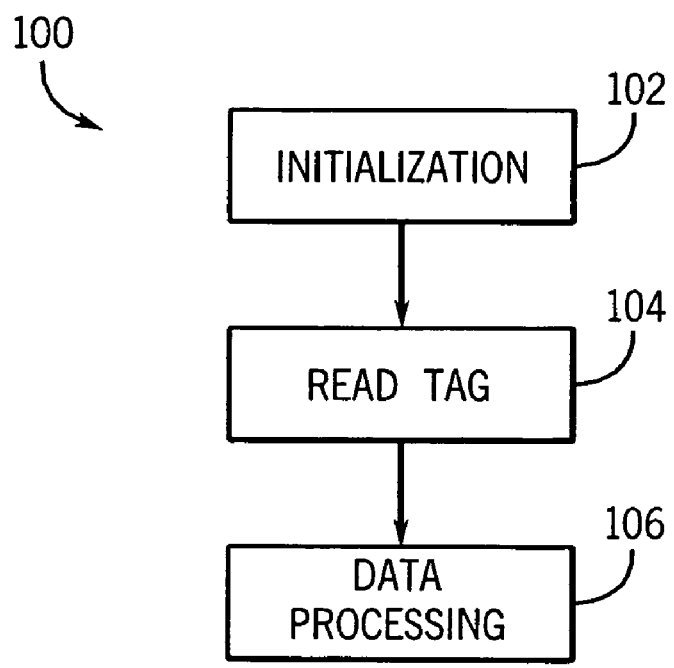
FIG. 14 is a flowchart illustrating a method in accordance with a preferred method embodiment.

Referring now to FIG. 14, a method 100 for tracking the storage time of a food product begins at step 102, whereby an associated tag 34 is initialized about when the original food product is to begin monitored storage. Typically this will be on the day the product leaves its original packaging, but might instead be the day a product is first stored by the consumer even though still in its original packaging.

At some point after the tag 34 has been initialized, the product storage time can be monitored via process 104. Finally, at step 106, relevant data pertaining to the product, including the age, can be processed and output to the user.

Figure 15:
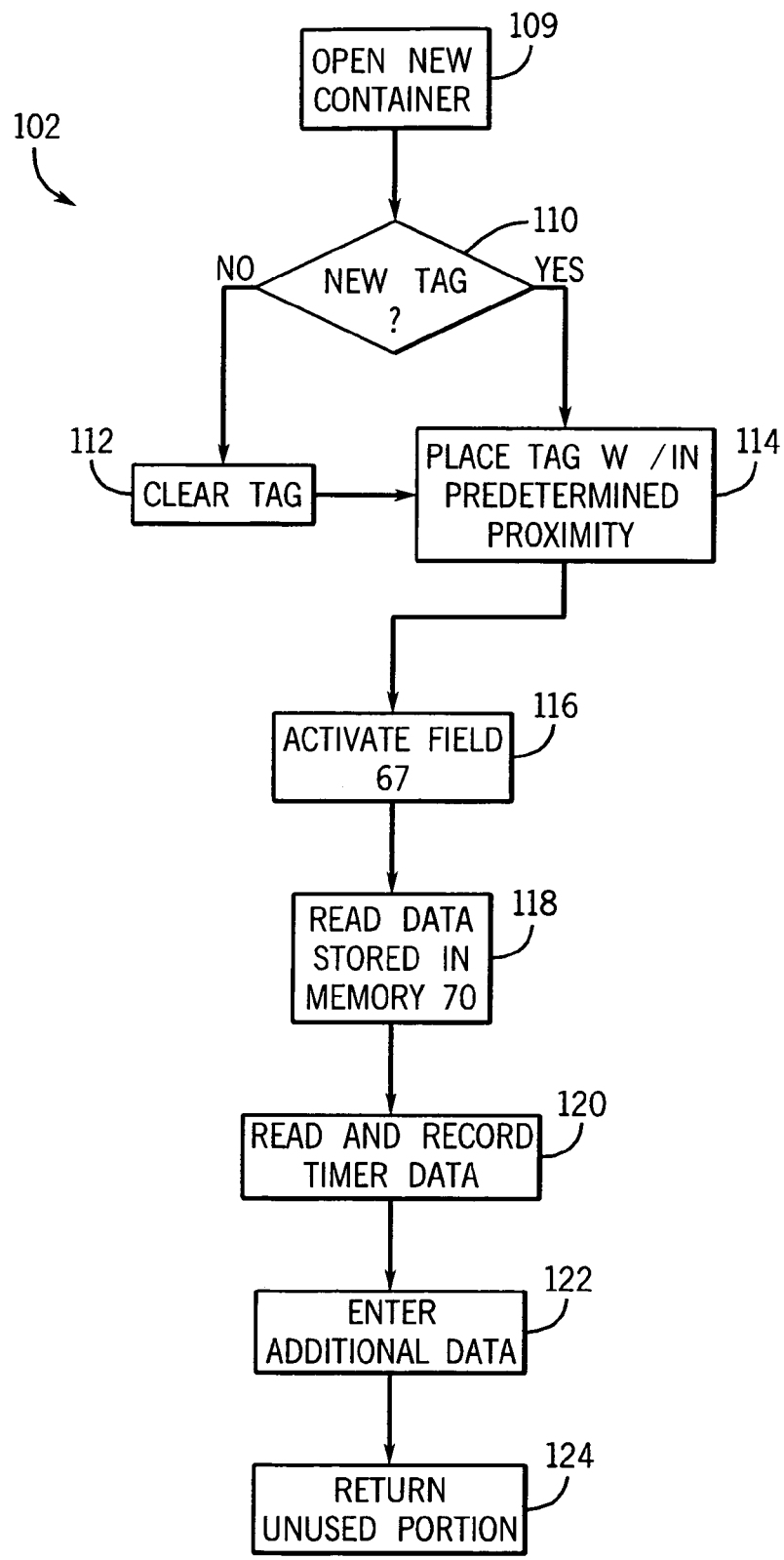
FIG. 15 is a flowchart illustrating steps taken to initialize a tag for a new food product.

Referring now to FIG. 15, the initialization process 102 begins at step 109 whereby the user decides to begin monitoring (e.g. they are about to store a partially used cheese wedge after the original package has been opened). At decision block 110, the user determines whether a tag 34 that is to be associated with that food product is new to the interrogator 32, or whether the tag had been used previously for a food product. For instance, the tag 34 could be new to the interrogator if the user plans on removing the food product from its original container, and placing it either in a disposable container 86 that carries a new tag 34, or a container that carries a disposable tag.

Furthermore, the user may wish to retain the food product in its original container that either bears a new tag 34, or to which the user can affix a new tag 34. Alternatively, an "old" tag 34 can be reused if, for instance, the user wishes to transfer the freshly opened food product to a washable container whose lid carries a reusable tag 34.

If tag 34 is new, the user places the article of interest (including tag 34) within a predetermined proximity (preferably less than 0.66 meters) to interrogator 32 at step 114. Otherwise, if the tag 34 was previously used for a different food product as determined at decision block 110 and the user wishes to reuse the tag, the user can activate a "clear tag" input 52 at step 112, which causes processor 56 to reset information for the next tag to be scanned. Process 102 then advances from step 112 to step 114.

Next, at step 116, the user activates the interrogator 32 by activating a "start" input, causing interrogator 32 to emit the energized magnetic field 67 for a predetermined period of time. Alternatively, field 67 could be emitted until the user deactivates the field using input if, for instance, multiple items are to be scanned.

At step 118, processor 56 reads the data stored in memory 70, including the tag identification code 98, that is transmitted to interrogator 32 from transponder 66 via data signal 82 that is produced in response to signal 67. It should be appreciated that interrogator 32 could alternatively constantly transmit energized signals 67 (or transmit signals 67 at predetermined intervals), such that a container 86 carrying tag 34 is automatically scanned when placed within the predetermined proximity.

At step 120, processor 56 reads timer 58 and stores the current timer or clock data along with the tag identification code 98 in memory 60.

At step 122, the user can manually enter additional data, including an identification for the food product, along with the printed manufacturer's expiration date using keyboard 50, a connected external computer 61, or microphone 65. The product identification and expiration date could alternatively be entered and associated with the appropriate tag 34 before the product has been opened.

At step 124, the user returns the unused portion of the opened food product, along with the packaging carrying corresponding tag 34, to pantry 79.

Figure 16:
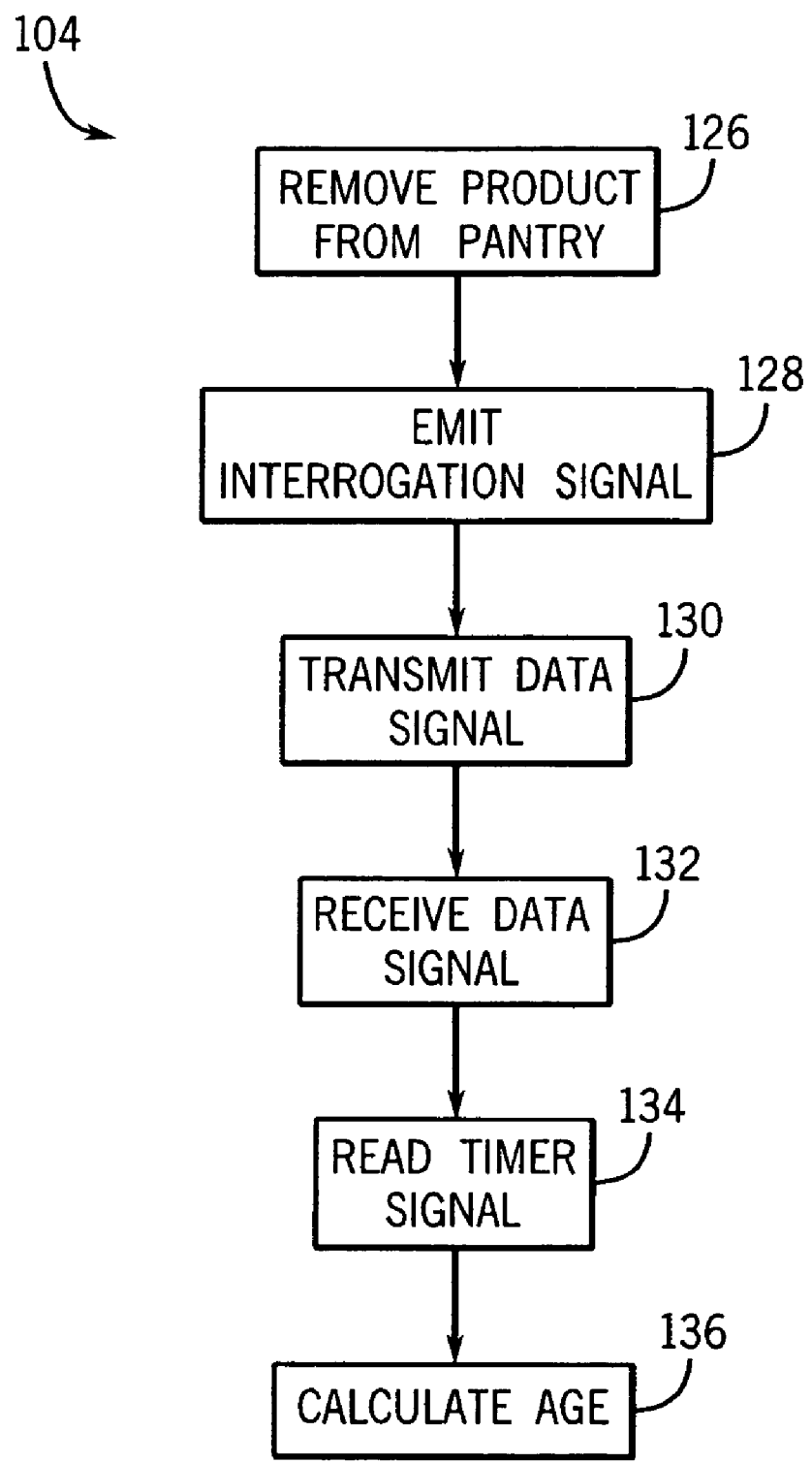
FIG. 16 is a flowchart illustrating steps taken to determine storage time (aging) of the food product.

Referring now to FIG. 16, once the tag 34 corresponding to a given food product has been initialized, and the food product stored for a period of time, the user can check on aging as desired. Routine 104 begins at step 126, whereby the previously stored food product is removed from pantry 79, and brought within the predefined proximity of interrogator 32. At step 128, interrogator 32 emits signal 67, which is received by the antenna 68 of RFID tag 34. The signal can be provided at regular intervals, as described above, or the user can activate the required input 52. Transponder 66 is then momentarily powered (if tag 34 is passive), and transmits data signal 82 at step 130. The data is received by interrogator 32 at step 132. The acquired data includes at least the tag identification information, and can further include a food product identification along with the manufacturer's recommended expiration date.

Next, at step 134, processor 56 reads the timer 58, and compares current timer information with the timer information previously associated with tag 34 when the tag was initially scanned. At step 136, processor 56 subtracts the previously stored timer information from the current timer information, and determines the storage time of the food product.

Figure 17:
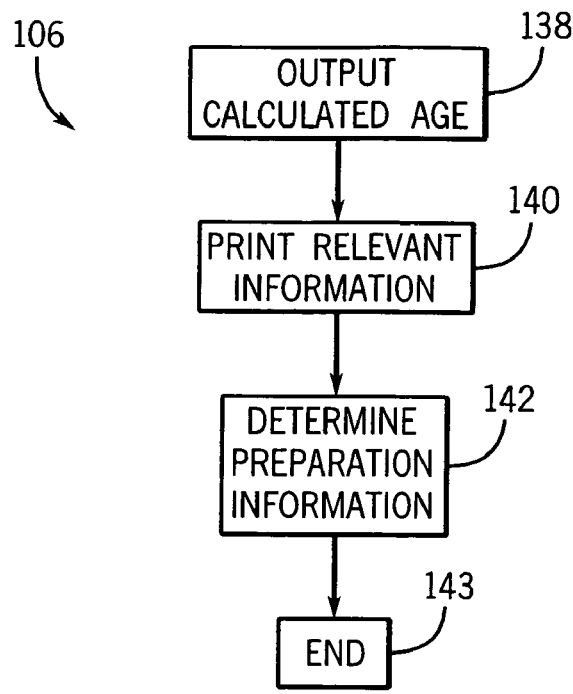
FIG. 17 is a flowchart illustrating an information processing routine relevant to a claimed method.

Referring now to FIG. 17, routine 106 begins at step 138, whereby the storage time previously calculated at step 136 is output to the user via display 54 or other external device. Moreover, if data in tag memory 70 or interrogator memory 60 includes the product identification and/or expiration time, the product and expiration time, along with the length of time remaining until the expiration date lapses, can also be provided at step 138.

Figure 22:
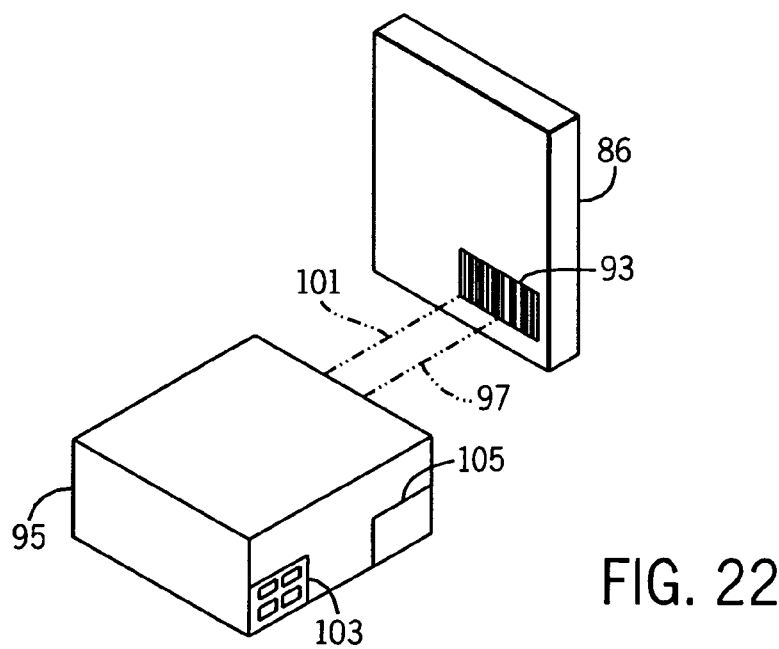
FIG. 22 is a device with a bar code suitable for use in combination with a management system.

At step 140, the user can activate an input 52 causing data relevant to the food product (including age, and other additional data stored in memory 70) to be sent to printer 59 and printed. In particular, referring to FIG. 22, a barcode 93 can be provided on container 86, that is either independent or integrated with respect to tag 34. Barcode 93 can thus be scanned by interrogator 32 before, after, or while the corresponding tag 34 is being scanned. It should thus be appreciated that the term "identifier" as used in this disclosure is intended to incorporate both RFID tag 34 and barcode 93.

If barcode 93 is provided on container 86 without the presence of tag 34, the barcode could be used in the manner described above with respect to RFID system 30. In particular, a barcode reader 95 emits a signal 97 in the form of a light beam towards the container 86 to be identified via barcode 93. The barcode reader 95 receives a response signal 101 from barcode 93 in the form of a reflected light beam that is uniquely coded to correspond to the barcode being scanned. The code received from the reflected signal 101 is then transferred (either via an internal or external microprocessor—not shown) into a memory. Reader 95 also includes an internal or external timer in the manner described above with respect to RFID interrogator 32. A set of inputs 103 can be provided that enable the user to attach an identification information of the food whose container is being barcode scanned. A display 105 can also be provided to provide output to the user.

The microprocessor of barcode reader 95 can thus operate a stored program of the type described above to perform methods 100, 102, 104, and 106 described above with respect to RFID system 30 to track the age of opened food product.

The interrogator 32 can further be programmed with a CueCat scanner for scanning the barcode 93. CueCat scanners are known for scanning an item and directing the user to a webpage that provides additional information on that item. Implemented in the context of inventory management system, the CueCat scanner can direct the user to a webpage on the Internet, either locally at interrogator 32 or at remote computer 61, for displaying information related to recipes using that food product, the estimated shelf life once opened from its original packaging, in addition to coupons that may be associated with purchasing the product. This information can either be read directly into memory 60, or alternatively can be manually input into memory 60, and linked with the RFID tag 34 associated with a particular product.

At step 142, the user can determine via input device 52, based on the storage time of a given food product, what types of food preparation methods are safely available for that product using data stored in interrogator memory 60. The user can further request, using input device 52, more specific information related to a class of items that are being tracked. For instance, interrogator 32 can group the scanned products into categories based on the remaining lifespan of the perishable goods, and display the category requested by the user via input 52. Those products, along with the estimated remaining lifespan, can be output on display 54 or other suitable device. Process 100 ends at step 143.

It should be appreciated that method 100 could be varied, for instance, to scan all items stored in pantry 79 when interrogator 32 is integrated in door 80 as described above with reference to FIGS. 8A-B. In particular, the range of signal 67 can be increased to 48 inches or greater, depending on the maximum distance between interrogator 32 and the most remote food product stored in pantry 79. Furthermore, activating input 52 can cause interrogator to scan all items in the pantry 79. Alternatively still, interrogator 32 can execute a stored program that causes processor 56 to scan all items in pantry 79 at predetermined intervals.

Figure 18:
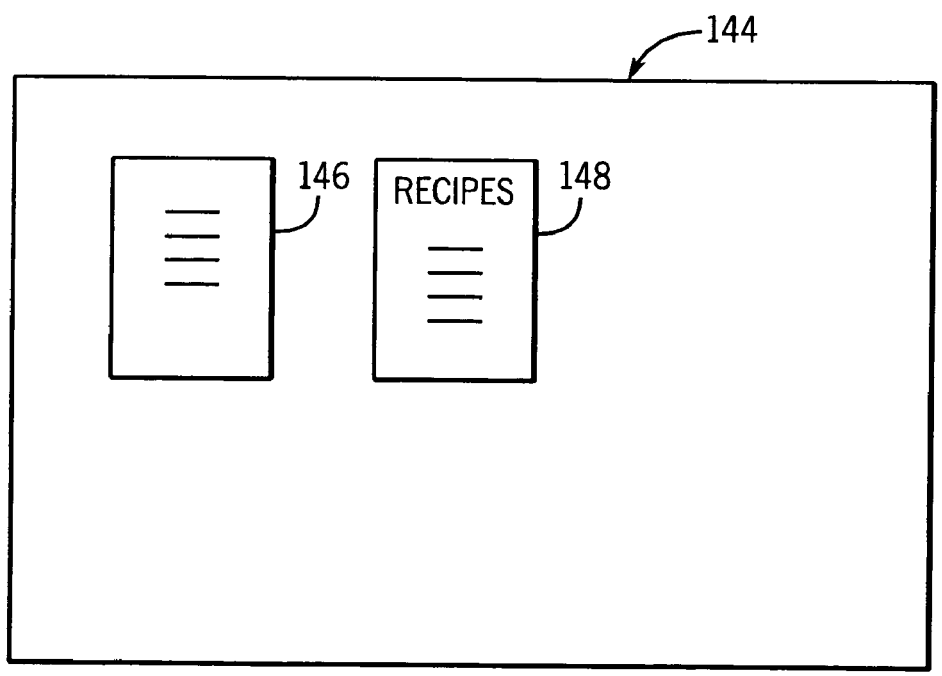
FIG. 18 is a schematic diagram of a database constructed in accordance with the preferred embodiment.

Alternatively, or in addition, interrogator 32 or computer 61 can execute a stored program that provides a database 144, as illustrated in FIG. 18. The database 144 can be used, for example, to compile information pertaining to all scanned food products, including the food product identification that was either encoded in tag memory 70, or entered into interrogator memory 36, along with the storage time of the product, expiration date of the product, and length of time remaining until expiration of the food product (i.e., life).

The life can either be determined based on the expiration date, or a preprogrammed length of time that an opened food product can be stored before spoilage. The user can further configure the database to provide a list 146 of needed items based on the length of time remaining until the food product expires. For instance, if less than a predetermined number of days remains before the product expires, the user can be reminded that a new product needs to be purchased.

Advantageously, the user can carry the portable interrogator 32 on his or her person while shopping. It is further envisioned that RFID tags on purchasable food products could be scanned by the interrogator 32 to track needed items as they are purchased, and update list 146 accordingly.

Interrogator 32 or computer 61 can further be programmed with a number of recipes 148 desirable to the user, along with the food products necessary to prepare the recipe. Alternatively, interrogator 32 can receive recipes over the Internet via an internal modem, or modem residing on an attached computer 161. The user can then, in the future, enter a desired recipe into database 144, which would then output the necessary ingredients along with the age and expiration status of each food product necessary for that recipe. Additionally, the user can configure computer 61 to communicate, via its modem, a grocery list to the user's desired marketplace of preference over the internet or email, wherein the grocery list includes products whose life is below a predetermined threshold.

Note that this is a significant improvement over computer inventory management systems which simply provide alarms after a given time has passed from an initiation of data input. Here the "alarm" or other information about the item won't be given if the food item is not proximate the interrogator. Thus, a consumer need not bother taking the data out of the system once leftovers are used.

Figure 19:
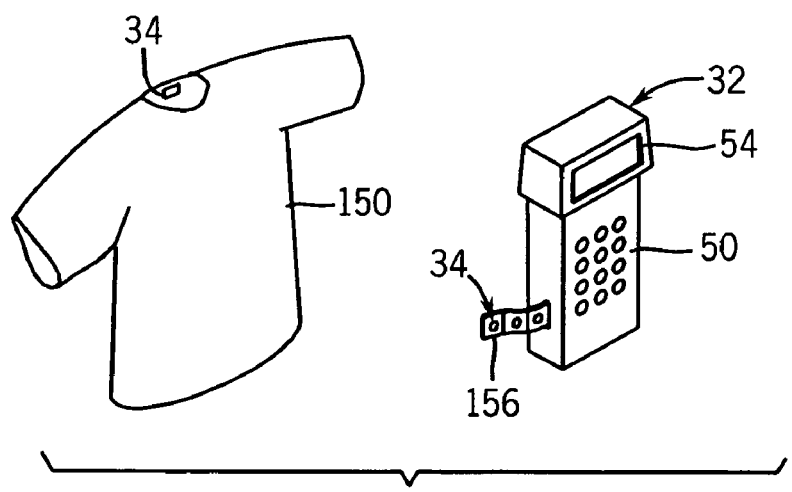
FIG. 19 is a perspective view of an interrogator/RFID dispenser, and associated clothing item.
Figure 20:
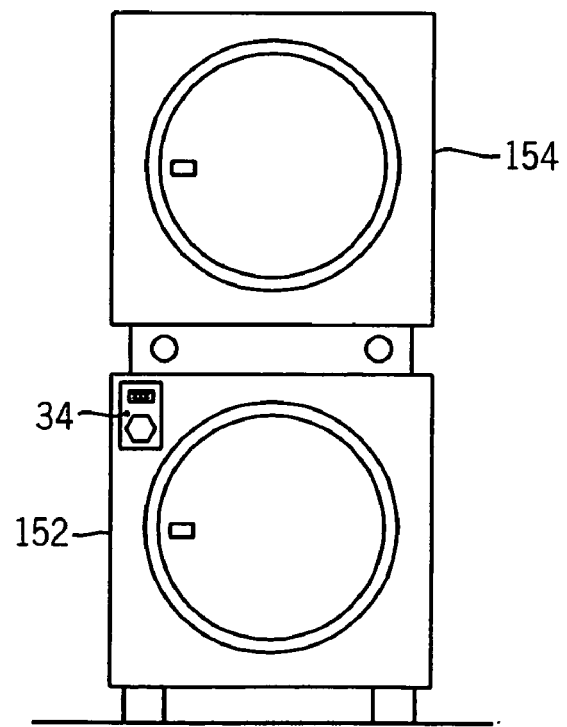
FIG. 20 is a schematic elevation view of a clothes washer/dryer combination with an associated interrogator.

Referring now to FIGS. 19 and 20, the present invention recognizes that such inventory management systems can be also used to track common household items other than perishable food. For example, if a user desires to track his or her articles of clothing, the user can enter data pertaining to a given article of clothing 150, including the type of article (e.g., shorts, pants, shirts) along with the color type for washing purposes (e.g., whites, darks, delicates). The data can be entered into memory 60 using keypad 50 or like data entry device. When the clothing is positioned near a washing machine or dryer, an interrogator on the washing equipment can interrogate the load of laundry, obtain feedback information about its nature, and then provide alarm signals regarding improper mixtures of laundry types. The interrogator can further provide output regarding washing instructions for a given type of clothing, for instance the water temperature and drying method that is to be used for a particular item of clothing, or whether the item should be dry cleaned only.

A roll of RFID tags 34 is provided that can be scanned individually and subsequently dispensed. Interrogator 32 can thus link the entered data with the corresponding tag identification code in memory prior to dispensing the tag 34. The dispensed tag 34 can have an adhesive backing removably attached to a substrate 156, such that the tag 34 can be removed from the substrate and adhered to an inconspicuous location on the article of clothing 150. Tag 34 could alternatively be clipped or otherwise mechanically fastened using any mechanical fastener known in the art.

Alternatively, if a tag 34 is preexisting, the tag can be initially scanned, such that the tag identification information is stored in interrogator memory 60 along with the entered data. The entered data is then stored in memory 60 and linked to the tag identification.

An interrogator 32 of the type described above can thus be disposed on a clothes washer 152 and/or dryer 154, and provide relevant information to the user. For instance, when the user wishes to place a load of laundry in washer 152, the appropriate input 52 can be activated to enable interrogator 32 to scan each item. The user can then be notified via display 54 and/or an audible alarm if the color types of any of the articles of clothing do not match.

Alternatively, the interrogator 32 can be configured with the desired color type that is to be washed, and alert the user when an article of clothing of a different color type is being placed in the washer 152. Furthermore, interrogator processor 56 can track the number of times each article of clothing has been washed, and provide feedback to the user as desired. Again, it is the interplay between the proximity to the sensor and the data on the items being monitored that provides a uniqueness to the system.

Figure 21:
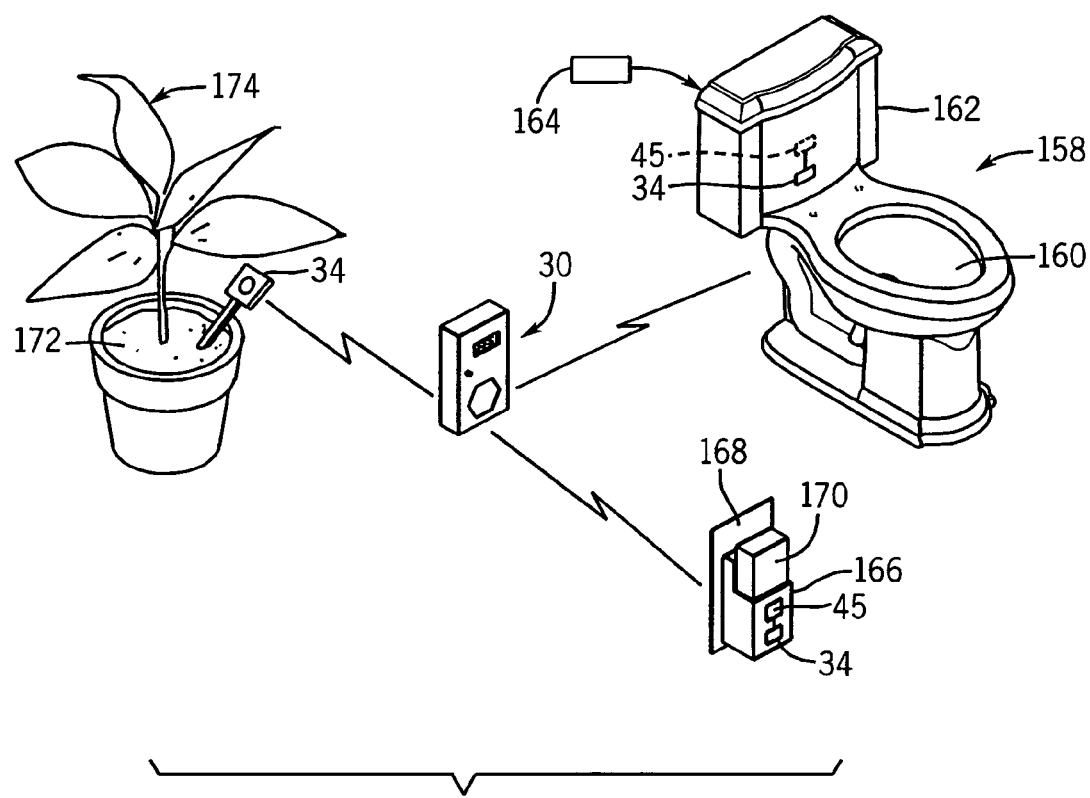
FIG. 21 is a schematic system as applied to monitoring toilet bowl cleaners and plant food sticks.

Referring next to FIG. 21, inventory management system 30 can be used to track other household items, particularly those that need to be refilled or replaced periodically. FIG. 21 discloses such a system used in connection with both toilet cleaners, air fresheners and plant maintenance systems. The system could also be used with air filters. Again, the system goes beyond merely timing from a common database. It uses the proximity of the device, or the lack thereof, to more efficiently provide inventory management.

For instance, a toilet 158 can be provided having the usual bowl 160 and tank 162. Toilet bowl cleaners such as blocks 164 are commonly used household products and can be installed into tank 162. Sensor 45 can be electrically connected to an active RFID tag 34 input using the alignment procedure described above. When the product is used up, a sensor activates the tag, and interrogation of the tag will then provide an alarm.

By way of another example, a plug-in air freshening device or insecticide dispenser 166 can be plugged into a conventional electrical receptacle 168. Device 166 includes a cartridge 170 containing a heat activated fragrance. Any suitable sensor 45 (such as a fluid level sensor) can be attached to cartridge 170. Sensor 45 can then be electrically connected to an active RFID tag 34 in the manner described above.

By way of another example, a moisture sensor (not shown) can be placed in the soil 172 of a plant 174, and coupled to an RFID tag 34 for providing an indication when various plants throughout the house are to be watered. Similarly, such a system could work with a plant feeding system.

Additionally, a heat or light sensor can be placed on a light fixture and coupled to an RFID tag for monitoring the length of time that the light bulb(s) have been illuminated, it being appreciated that bulbs have a lifespan dependent upon the duration of illumination. Additional items that can be sensed using inventory management system include, but are not limited to, HVAC filter life, overflowing sump pumps, operability of furnaces, lawn maintenance, volume of salt in water softeners, maintenance charts for automobiles, overflowing drains, shaving equipment, and availability of medicinal products.

A sensor can further be provided under a mat (not shown) and coupled to a corresponding tag 34 for determining foot traffic over a given area, requiring some maintenance chemical to be applied thereto.

During operation, tag 34 is initially scanned by interrogator 32 of the type described above (but with an interrogation range up to 100 feet or more, depending on the distance between the interrogator and the items to be sensed). Information related to the tag, including the product to be sensed and lifespan of that product, in addition to whether the product is to be replaced or refilled upon expiration of the lifespan, is stored in memory 60. Tag 34 is then placed on the device and electrically to the corresponding sensor 45.

Interrogator 32 can then transmit signal 67 automatically at predetermined intervals or upon activation of a user input 52. Interrogator 32 receives data signals 82 from the corresponding tags 34, and determines whether any of the monitored products are going to expire, or need other maintenance, within a predetermined timeframe. The expiring products can be added to list 146 in database 144.

Figure 23:
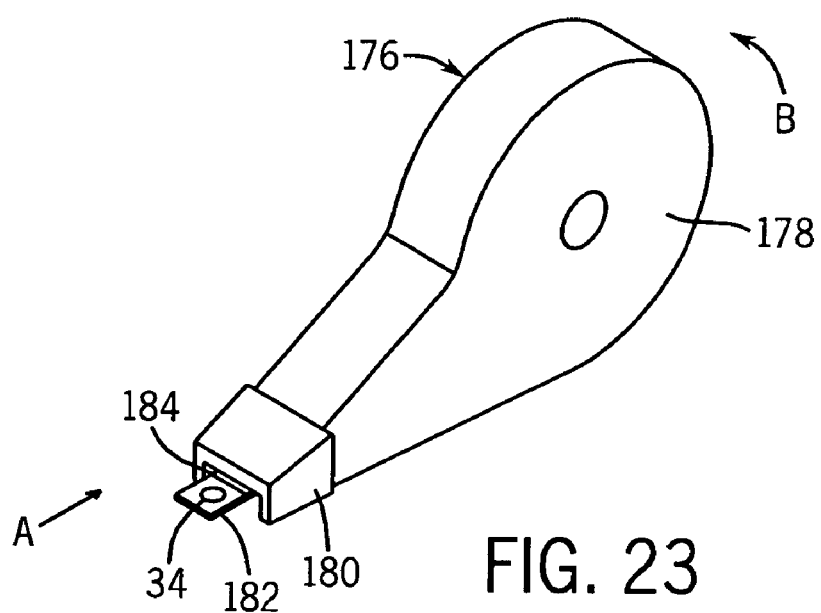
FIG. 23 is a perspective view of an alternative RFID tag dispenser.

The present invention further recognizes the advantages in providing consumers a cost-effective method for dispensing disposable RFID tags 34 that are usable in combination with inventory management system 30. Referring to FIG. 23, a tape dispenser 176 is provided having a round housing portion 178 and an integral dispensing end 180. Housing portion retains a wound elongated tape 182 carrying RFID tags 34 constructed in accordance with any of the embodiments discussed above.

Tape 182 presents a tacky attachment surface opposite the surface that carries tags 34. Preferably the carried RFID tags 34 are passive. Tape 182 is perforated at locations between adjacent tags 34. A lip 184 is provided at the distal end of dispensing portion, and extends downwardly towards tape 182.

During operation, dispenser is translated in a direction from dispensing portion to housing portion as indicated by Arrow A. The tacky attachment surface of tape 182 is brought into contact with an underlying object that is to carry an RFID tag 34. The housing portion 178 is then rotated upwardly about dispensing end 180 in the direction of Arrow B, causing lip 184 to contact the perforations and separate the tag 34 being applied from the remainder of tape 182. The bottom of dispensing end 180 is open, such that the next tag 34 to be dispensed is able to contact an underlying surface for attachment.

Figure 24:
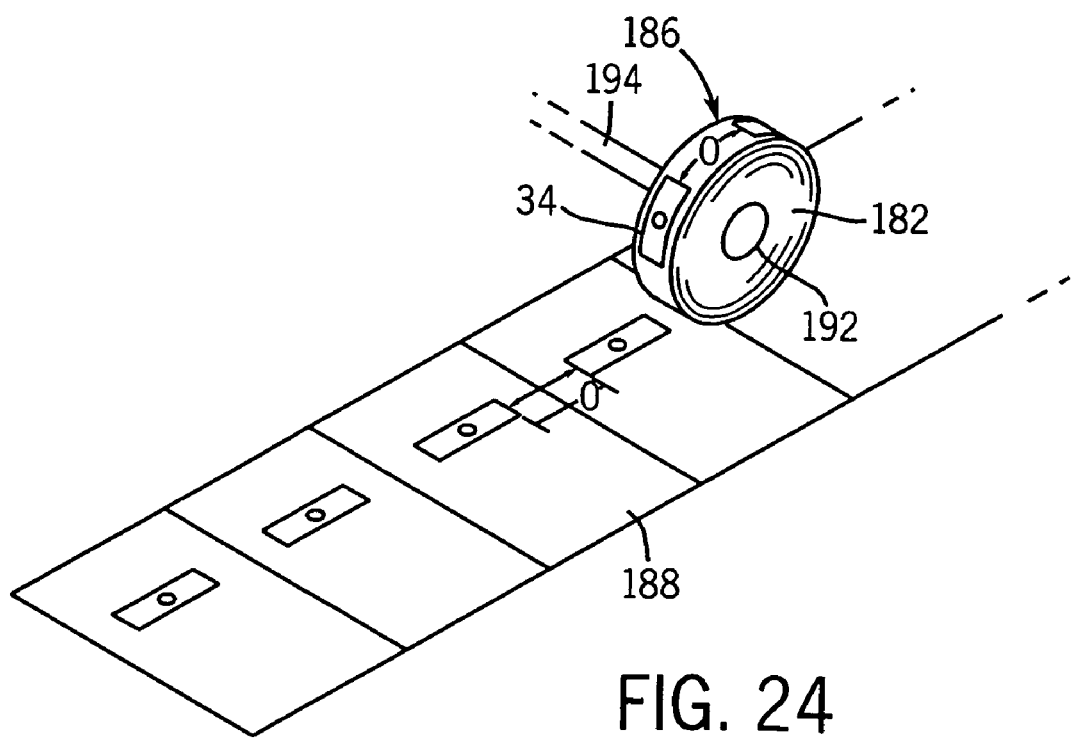
FIG. 24 is a perspective view of an alternative RFID tag dispenser.

Referring now to FIG. 24, a tag dispensing apparatus 186 is provided in accordance with an alternate embodiment. Apparatus 186 includes a roll of elongated tape 182 carrying RFID tags 34 on its outer surface that are spaced a distance D apart from each other. The inner (exposed) surface of tag 34 on tape 182 is tacky for attachment with underlying mounting surfaces 188 that are connected to form a longitudinally elongated body of connected surfaces that are spaced longitudinally apart the same distance D.

Apparatus 186 presents a hub 192 that is centrally disposed with respect to the roll of tape 182, and rotatably attached to a handle 194. RFID tags 34 are thus applied to surfaces 188 by rolling apparatus in the longitudinal direction, such that tags 34 peel off of from tape 182 and attach to surfaces 188. It should be appreciated that tags 34 can include transponder 66, antenna 68, and memory 70. Alternatively, tags can include transponder 66 and memory 70, with antenna 68 pre-printed on surfaces 188, such that attachment of tags 34 to surfaces 188 connects the transponder 66 to the underlying antenna 68.

Figure 25A:
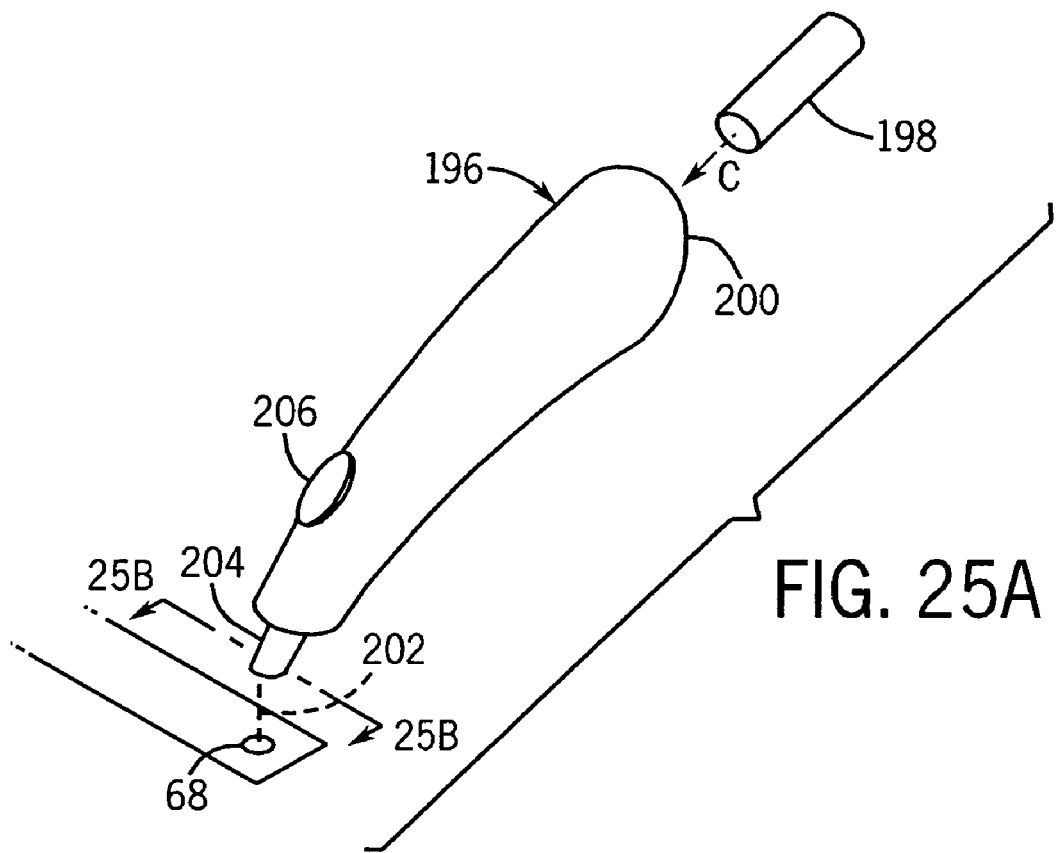
FIG. 25A is a perspective view of an RFID tag fabrication apparatus constructed in accordance with an alternate embodiment.
Figure 25B:
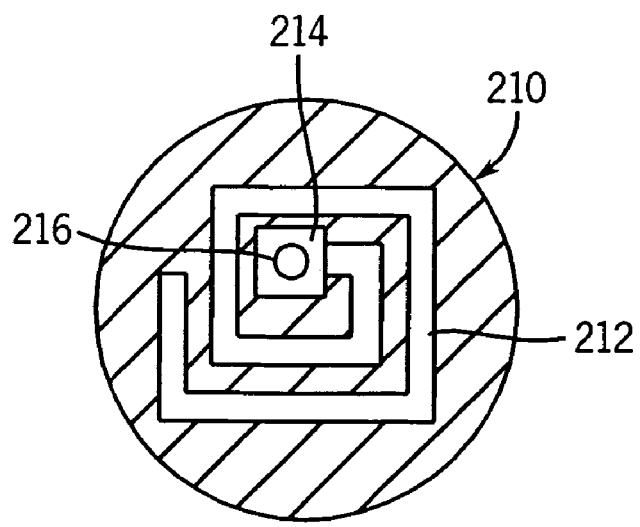
FIG. 25B is a sectional end elevation view of the apparatus taken along line 25B-25B in FIG. 25A.

Referring to FIGS. 25A and 25B, a method and apparatus are provided for pre-printing an antenna 68 on an underlying substrate. In particular, a pen 196 is provided that receives a cartridge 198 at a loading end 200 along the direction of Arrow C. Cartridge 198 contains a conductive (e.g., carbon) ink 202 that can be dispensed via a dispensing end 204 of the pen. A second cartridge 199 of RFID tags 34 can also be inserted into loading end 200. Pen 196 further includes a button 206 disposed proximal the dispensing end 204 so as to be comfortably engaged by a user's finger. Depressing button 206 causes a predetermined dosage of ink to be dispensed from dispensing end 204. Dispensing end 204 further includes a die 210 presenting a first opening 212 in the shape of an antenna suitable for RFID tag 34.

The ink 202 is preferably directed into the antenna-shaped opening 212. Preferably dispensing end 208 is pushed against underlying surface 188, which depresses the dispensing end 208 and unlocks button 206. Contacting dispensing end 208 with surface 188 when ink 202 is dispensed ensures that the antenna pattern will be successfully transferred onto surface 188. A transponder 66/memory 70 can then be aligned with antenna 68 and applied to surface in the manner described above Die 210 can further include a central opening 214 for allowing a transponder 66 and memory 70 to pass through onto surface 188. Opening 214 is positioned immediately adjacent the terminal end of antenna opening 212 such that transponder 66 will make sufficient electrical contact with the ink 202. A key 216 is provided in opening 214 that mates with a corresponding groove in the substrate carrying the transponder 66/memory 70, thereby ensuring that the transponder 66/memory 70 are properly oriented when applied to surface 188. When a tag 34 is to be fabricated, the ink is directed into opening 212, while the substrate carrying the transponder 66 and memory 70 are directed into opening 214.

It is specifically intended that the present invention not be limited to the embodiments and illustrations contained herein, but that modified forms of those embodiments including portions of the embodiments and combinations of elements of different embodiments also be included as come within the scope of the following claims.

We claim:

1. management system for monitoring selected perishable food products, the system comprising:
   a container suitable to sequentially hold the selected perishable food products;
   a radio frequency identification tag linked to the container, wherein the identification tag is passive in the absence of interrogation, and upon interrogation can supply tag identification information without also supplying information about a food product characteristic;
   an interrogator suitable to interrogate the radio frequency identification tag, the interrogator comprising a processor that can execute a stored program to:
   i. apply an initial interrogation signal to the identification tag as one begins to monitor the container;
   ii. receive an initial response signal from the identification tag in response to the initial interrogation signal, wherein the initial response signal has tag identification information;
   iii. store the tag identification information along with both an indication of an initial monitoring time for the container with an indication of a characteristic of a first food product stored therein;
   iv. apply a subsequent interrogation signal to the identification tag, wherein the subsequent interrogation signal occurs after the initial interrogation signal;
   v. receive a subsequent response signal from the identification tag in response to the subsequent interrogation signal, wherein the subsequent response signal includes the tag identification; and
   vi. determine an elapsed time between the initial monitoring time and the time of the subsequent response signal;
   a user interface whereby a user can enter into the processor, without storing additional data on the tag, a characteristic of the first food product when that first food product is about to be monitored, and whereby a user can thereafter activate an instruction to clear the initial monitoring time, elapsed time, and food characteristic information in the processor with respect to that first product in order to permit re-use of the container with a second selected food product; and
   wherein the interrogator further comprises a display configured to display the characteristic of the first food product along with the time that the first food product has been monitored.

2. The management system as recited in claim 1, wherein the system is for use with a food storage cabinet selected from the group consisting of refrigerators, pantries and other cabinets.

3. The management system as recited in claim 2, wherein the interrogator is configured to be mounted onto a surface of the cabinet.

4. The management system as recited in claim 3, wherein the surface is a door.

5. The management system as recited in claim 1, wherein the indication of a characteristic of the first food product comprises projected expiration information for the food product.

6. The management system as recited in claim 1, wherein the interrogator comprises an antenna mounted on a door and extending inward therefrom, and a display facing outwardly from the door.

* * * * *